US008298361B2

(12) United States Patent
Beckstrom

(10) Patent No.: US 8,298,361 B2
(45) Date of Patent: Oct. 30, 2012

(54) POSTAGE LABEL DISPENSER FOR DISPENSING APPLICATION READY/LINED LABELS INCLUDING A RE-LINING STATION FACILITATING THE FABRICATION OF LINED LABELS

(75) Inventor: David W. Beckstrom, Roxbury, CT (US)

(73) Assignee: Pitney Bowes Inc., Stamford, CT (US)

( * ) Notice: Subject to any disclaimer, the term of this patent is extended or adjusted under 35 U.S.C. 154(b) by 329 days.

(21) Appl. No.: 12/639,167

(22) Filed: Dec. 16, 2009

(65) Prior Publication Data

US 2011/0139360 A1 Jun. 16, 2011

(51) Int. Cl.
*B32B 38/04* (2006.01)
(52) U.S. Cl. ......................... 156/249; 156/511; 156/353
(58) Field of Classification Search .................. 156/249, 156/511, 353
See application file for complete search history.

(56) References Cited

U.S. PATENT DOCUMENTS 4,180,181 A * 12/1979 Brandwein .................... 221/70
5,259,681 A * 11/1993 Kitazawa et al. ............ 400/621
2009/0028622 A1* 1/2009 Kobayashi et al. ........... 400/613
* cited by examiner

*Primary Examiner* — Khanh P Nguyen
*Assistant Examiner* — Margaret Squalls
(74) *Attorney, Agent, or Firm* — Brian A. Collins; Charles R. Malandra, Jr.; Steven J. Shapiro

(57) ABSTRACT

A postage label dispensing system for dispensing adhesive-backed postage labels comprising (i) a means for stripping the adhesive-backed face material from the liner material of a label material, (ii) a first cutting apparatus, downstream of the stripping means, for cutting the face material to a desired length and producing an adhesive backed postage label having a postage indicia printed thereon, (iii) a means for attaching re-lining material to the adhesive backed postage label (iv) a second cutting apparatus, downstream of the lining means, for cutting the re-lining material to dispense at least one lined postage label, and (v) a processor for controlling the operation of the first and second cutting apparatus. A deflector guide is disposed between the stripping and re-lining means and is re-positionable to engage and disengage the adhesive backed postage labels produced by the upstream stripping station. In the engaged position, the postage labels are directed to the re-lining station and dispensed as a lined label. In the disengaged position, the postage labels are dispensed as application ready labels.

11 Claims, 7 Drawing Sheets

POSTAGE LABEL DISPENSER FOR DISPENSING APPLICATION READY/LINED LABELS INCLUDING A RE-LINING STATION FACILITATING THE FABRICATION OF LINED LABELS

FIELD OF THE INVENTION

The present invention relates to apparatus for producing adhesive-backed labels, and more particularly, to a system and method for dispensing application ready/lined labels including a re-lining station facilitating the fabrication of lined labels

BACKGROUND OF THE INVENTION

Conventional apparatus for producing and dispensing adhesive-backed labels include: (i) a device for printing information/symbology on the face of a label supply, i.e., a web/spool of a label face/liner material, and (ii) a cutting apparatus for stripping the label face/liner material from the web/spool i.e., to produce a single adhesive-backed/lined label. While some of the label producing apparatus provide a stack of individually-printed labels ready for an operator to remove the liner (also referred to as the "backing material"), other label fabrication systems (oftentimes including a device known as "peeler bar") automatically separate the face material from the liner to provide an application-ready label. With regard to the former, it will be appreciated that the stack of labels facilitates application thereof at a subsequent time or at a remote location, i.e., not within the immediate vicinity of the label producing apparatus. However, the operator is tasked with removing the adhesive backed label from the liner at the time of application which can be a laborious/costly operation. With respect to the former, it will be appreciated that the automated system for stripping the adhesive-backed label face from the liner can be complex, and does not provide the operator with the option of applying the label at a remote location. That is, an operator must apply individual labels immediately upon label dispensation.

Mailing machines are devices which may include a label fabrication and/or dispensing system for the purpose of applying postage to mailpiece envelopes. These machines often include an option to print and dispense postage indicia/franking symbology either; (i) directly on the face of a mailpiece envelope, or (ii) on an adhesive-backed label which can, thereafter, be applied to the mailpiece envelope. With respect to the latter, the option to print a postage indicia/franking label is often selected when the surface contour of the mailpiece envelope is irregular and printing directly on the face may result in a distorted image. Examples include envelopes having irregularly shaped content material, or those including a liner or layer to protect fragile content material ("bubble-wrap" protection).

These options are accommodated by a print station having at least one print head which is moveable, along rails or guides, from one feed path to another. In one operating mode, the print head is positioned in the feed path of a sealed/completed envelope to print on the face of the envelope, and, in another operating mode, the print head is positioned directly over the feed path of a supply/spool of label face/liner material. Once printed, the label is cut, accumulated and/or dispensed in one of two operating modes. In one operating mode, the label dispensing system produces application ready labels, and in another operating mode, the system produces a plurality of lined labels.

Label dispensing systems may receive a supply of label material which is pre-cut, i.e., a supply which includes a plurality of kiss-cuts between each printed label (a cut through the face material without severing the carrying liner material), or a label supply which is un-cut. When the supply is un-cut, the label dispensing system includes a cutting apparatus to produce the necessary kiss-cuts such that labels of variable length may be produced. While label dispensing systems capable of producing a kiss-cut provide greater flexibility with respect to the size of labels produced/dispensed, the cutting apparatus must be remain highly accurate and reliable, over multiple cutting cycles, to prevent severing the liner material. That is, the cutting apparatus must be manufactured to high tolerances and perform reliably over many usage cycles. Accordingly, these cutting apparatus add significant cost to the label dispensing system and/or may adversely impact the function of the label dispensing system, i.e., when the cutting apparatus severs the liner material such that an operator must re-thread the label supply through the various rollers of the label dispensing system.

In addition to the various shortcomings associated with conventional label fabrication/dispensing systems, mailing machines introduce the added complexity of printing currency on the labels which are fabricated. That is, inasmuch as the label fabrication systems commonly associated with mailing machines print currency, these systems must be highly reliable to prevent the operator from incurring additional cost as a result of a torn or damaged postage indica/franking label. It will be appreciated that, once debited from the vault of the mailing machine, a damaged or improperly printed/dispensed postage label cannot be easily/immediately credited without being validated by an authorized source, e.g., a Postal Authority.

A need, therefore, exists for a system and method for fabricating/dispensing adhesive-backed postage labels which (i) accommodates multiple operating modes, i.e., application ready and lined postage labels, (ii) produces postage labels of variable length, (iii) eliminates cutting apparatus required to produce kiss-cuts, and (iv) minimizes complexity for added reliability.

SUMMARY OF THE INVENTION

A postage label dispensing system Is provided for dispensing adhesive-backed postage labels comprising (i) a means for stripping the adhesive-backed face material from the liner material of a label material, (ii) a first cutting apparatus, downstream of the stripping means, for cutting the face material to a desired length and producing an adhesive backed postage label having a postage indicia printed thereon, (iii) a means for attaching re-lining material to the adhesive backed postage label (iv) a second cutting apparatus, downstream of the lining means, for cutting the re-lining material to dispense at least one lined postage label, and (v) a processor for controlling the operation of the first and second cutting apparatus. A deflector guide is disposed between the stripping and re-lining means and is re-positionable to engage and disengage the adhesive backed postage labels produced by the upstream means. In the engaged position, the postage labels are directed to the re-lining station and dispensed as a lined label. In the disengaged position, the postage labels are dispensed as application ready labels.

BRIEF DESCRIPTION OF THE DRAWINGS

Further details of the present invention are provided in the accompanying drawings, detailed description, and claims.

DETAILED DESCRIPTION

A system for dispensing and/or fabricating adhesive-backed labels is described herein. The invention is described in the context of a system for dispensing printed labels, a module for dispensing printed labels, and a system for fabricating and dispensing postage labels. The inventive teachings are also described in the context of a mailing machine for printing postage indicia/franking labels, although, it should be appreciated that any label producing and/or dispensing apparatus may be employed. A mailing machine merely provides an illustrative example of one embodiment of the invention, and should not be considered limiting when interpreting the meaning and/or scope of the appended claims.

Figure 1:
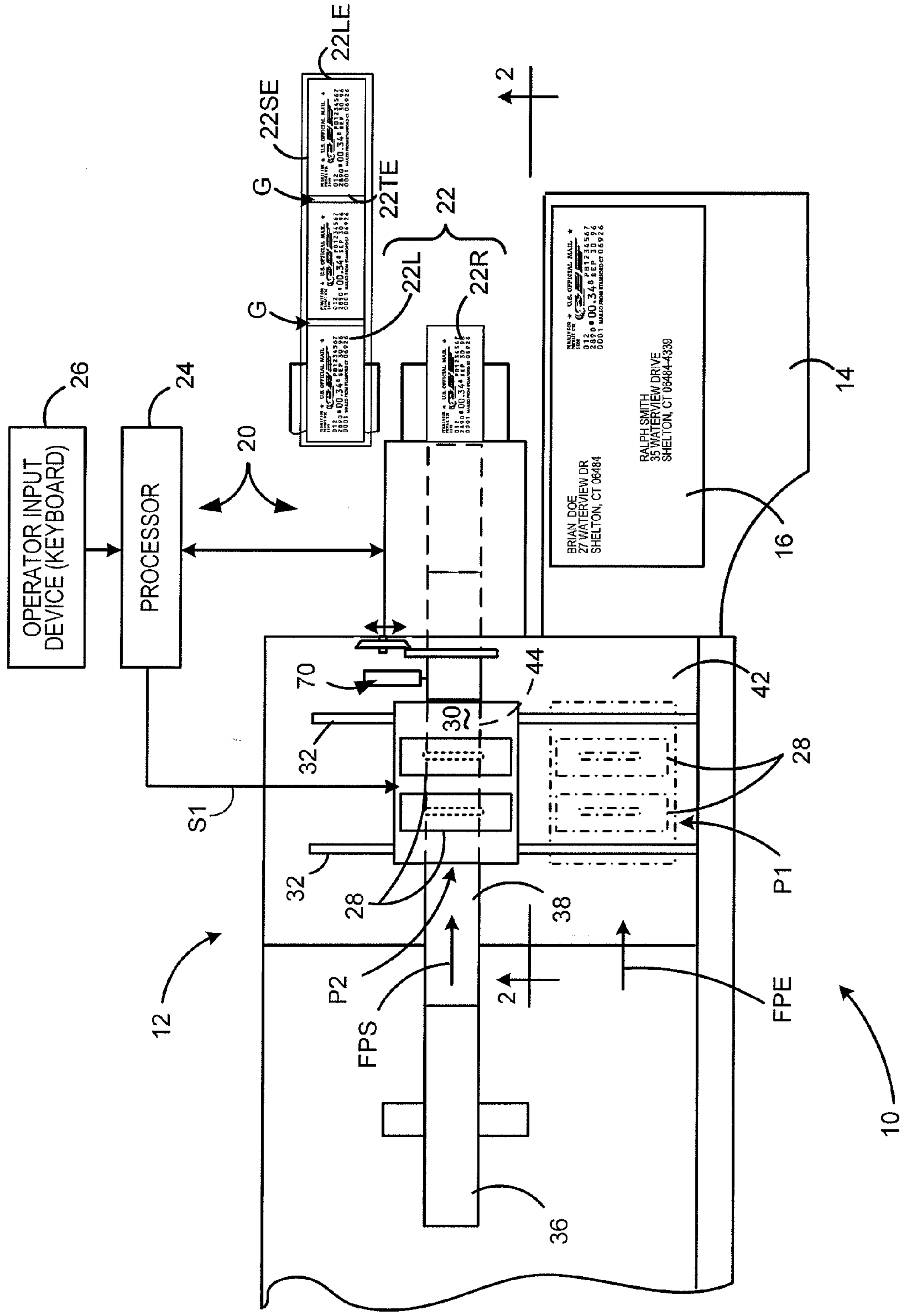
FIG. 1 is a top schematic view of a mailing machine including a positionable print head for printing along two feed paths, a first feed path for printing on the face of a mailpiece envelope, and a second feed path for printing on label material.

FIG. 1 depicts a schematic, broken-away top view of a mailing machine 10 according to the teachings of the present invention. In particular, the views illustrate a print station 12 in combination with a forward stacking tray 14 for receiving finished mailpieces 16, and a system 20 for dispensing adhesive-backed postage indicia/franking labels 22 (hereinafter referred to simply as "postage labels"). The postage labels 22 may be dispensed as application ready labels 22R, i.e., adhesive backed printed labels having the lining removed for immediate application, or as lined labels 22L, i.e., printed labels 22 with a liner to protect the adhesive backing of the printed label 22 for subsequent application.

The mailing machine 10 and label dispensing system 20 of the present invention include a processor 24 which receives operator input through a conventional input device 26, e.g., a touch screen display, keyboard, etc., to control the various operations of the mailing machine 10 and label dispensing system 20. With regard to the mailing machine 10, these inputs may include information regarding the type of mailpieces being processed, their weight, (if the machine is not equipped with a scale, or weigh-on-the-way system), print resolution, vault information, encryption/security inputs, network information, etc. In addition to these inputs, the mailing machine 10 of the present invention includes an option to print postage indicia and/or franking symbology either: (i) on the face of the mailpiece envelope 16, or (ii) on the face of the postage label 22. This is achieved by mounting at least one of the print heads 28 on a moveable carriage 30/rail system 32 which extends orthogonally across the feed path FPE of the processed mailpiece envelope 16 or, the feed path FPS of a web/spool 36 of label material 38. More specifically, the processor 24 is operatively coupled to an actuator (not shown) in the print station 12 to reposition at least one of the print heads 28 along one of the feed paths FPE, FPS depending upon the option selected by the operator. In a first position P1 (shown in phantom lines), the print heads 28 are disposed across the feed path of finished mailpieces and print postage indicia directly on the face of the mailpiece envelope 16. In a second position P2, (shown in solid lines), the print heads 28 are positioned across the feed path FPS of the web/spool supply 36 to print the postage indicia on the face of the label material 38.

While not shown in the schematic illustrations, each feed path FPE, FPS includes a transport system for conveying the finished envelope 16 or supply of label material 38. An envelop transport system may include a series of rollers along an envelope transport deck 42 of the mailing machine 10 for conveying the finished mailpiece through the print station 12 to the stacking tray 14. Similarly, a label material transport system may include rollers (not shown) to pay-out/reel-in the label material 38 along a label transport deck 44 through the print station 12 to the label dispensing system 20.

Before discussing the operation of the label dispensing system 20, it will be useful to provide a brief description of the various components and their arrangement within the mailing machine 10. In the described embodiment and referring to FIGS. 1 and 2, the print heads 28 of the mailing machine 10 print postage indicia on the label material 38 which includes an adhesive-backed face material 46 and a liner material 48 to protect and carry the adhesive-backed face material 46. It will be appreciated that the face material 46 is processed by the mailing machine 10 and the label dispensing system 20 (i.e., printed, cut and dispensed) to produce the postage labels 22, i.e., either an application ready label 22R or a lined-label 22L. Once printed, the label material 38 is paid-out though an exit orifice EX of the mailing machine 10 and received by the label dispensing system 20.

Figure 2:
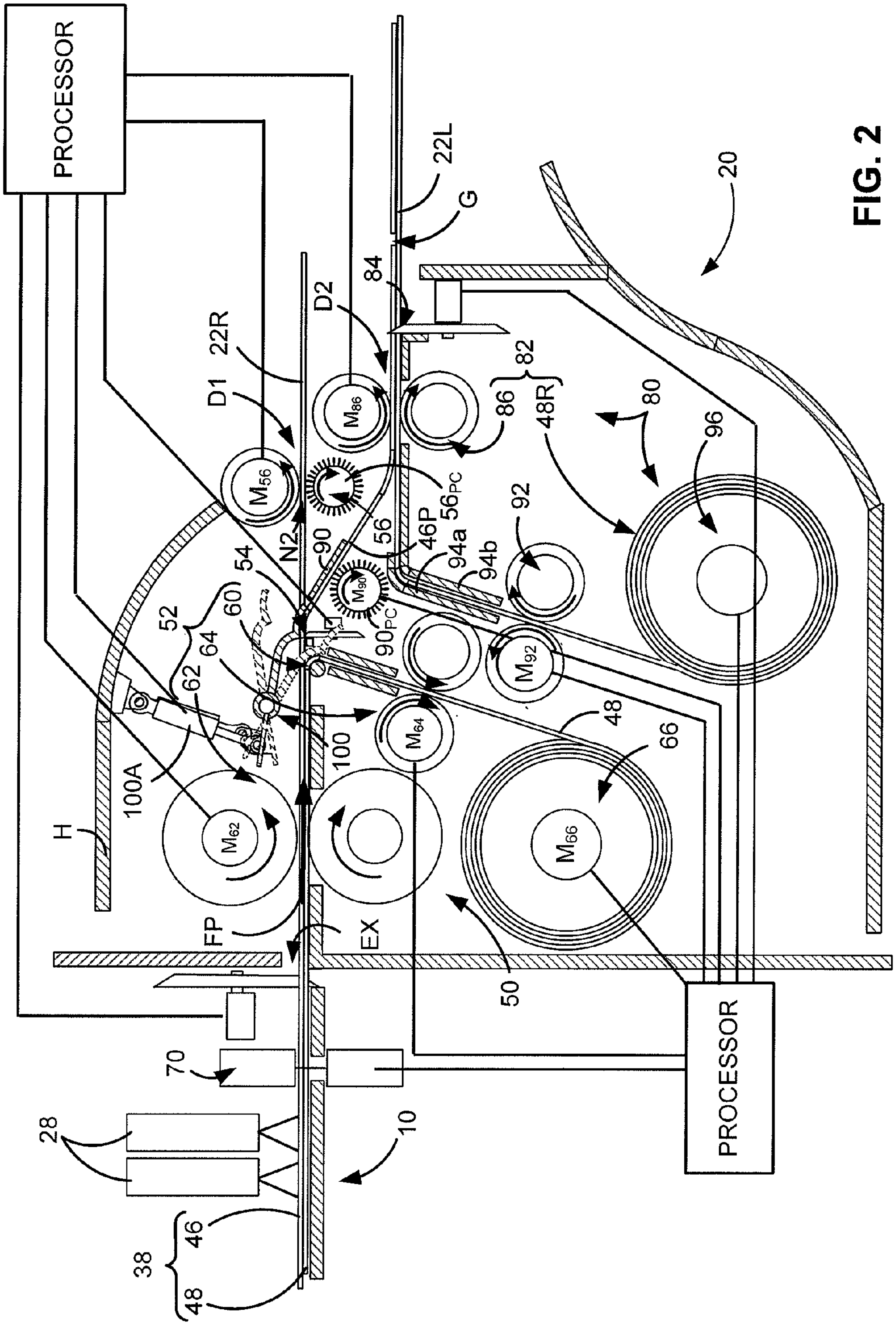
FIG. 2 is a side schematic view of the mailing machine from a perspective along line 2-2 of FIG. 1 depicting the relevant details of a label dispensing system including a label stripping station operative to remove liner material from a printed label, and a label re-lining station, downstream of the stripping station, operative to apply re-liner material to adhesive-backed face material received from the stripping station.

In FIG. 2, the label dispensing system 20 includes a label stripping station 50 and a re-lining station 80 disposed downstream of the stripping station 50. In the context used herein, the term "stripping" means any device for separating or removing the face material 46 of the label material 38 from the underlying carrier or liner material 48. The upstream label stripping station 50 is operative to dispense application ready labels 22R through a dispensing outlet D1, or to separate and cut adhesive-backed face material 46P, i.e., face material 46 having postage indicia printed thereon, to the label re-lining station 70. The downstream label re-lining station 80 is operative to attach re-liner material 48R to the adhesive-backed face material 46P and dispense one or more lined labels 22L. Additionally, the processor 24 is operative to control the label stripping and re-lining stations 50, 80 such that a gap G is produced between consecutive adhesive-backed face material 46P, i.e., as they are re-lined, to eliminate the requirement for a kiss-cut and facilitate removal of the label 22L from the liner 48R. These features of the present invention will be discussed in greater detail when discussing the operation of the label dispensing system 20.

The label stripping station 50 includes a means 52 for stripping the adhesive backed face material 46 from the liner material 48, and a first cutting apparatus 54, downstream of the stripping means 52, for cutting the face material 46 to a desired length. In one operating mode, the adhesive-backed face material 46 is cut and disposed through one dispensing outlet D1 as an application ready label 22R. The application ready label 22R is dispensed through a pair of exit rollers 56 including a point contact roller 56PC opposing the adhesive backing of the postage label 22R to prevent the adhesive backing from adhering to the label 22R as it passes through the nip N2 of the rollers 56PC. In the other operating mode, the adhesive-backed face material 46 is diverted to the downstream label lining station 80 to re-line the face material 46 for dispensing one or more lined labels 22L through another dispensing outlet D2.

The means 52 for stripping the adhesive backed face material 46 from the liner material 48 includes a peeler bar 60 disposed between a first and second pair of rollers 62, 64 for bi-directionally displacing the label material 38 around the peeler bar 60. The first and second roller pairs 62, 64 are each driven by at least one drive motor $M_{62}$ and $M_{64}$ respectively, which are electrically coupled to, and controlled by, the processor 24 of the label dispensing system 20. The peeler bar 60 effects an abrupt directional change in the feed path FP of the label material 38 such that as the liner material 48 is pulled across, i.e., frictionally engages, the peeler bar 60, and the adhesive backed face material 46 separates from the liner material 48. That is, the adhesive backed face material 46 is sufficiently stiff and the adhesion sufficiently low to cause the face material 46 to separate from the liner material 48 as the liner material 48 is pulled taut around the peeler bar 60 and collected by a reeling mechanism 66. In the described embodiment, the reeling mechanism 66 is disposed downstream of the second pair of rollers 64, and, a motor $M_{66}$, drives the reeling mechanism 66 for collecting liner material 48 as it separates from the face material 46.

The first cutting apparatus 54 cuts an application ready label 22R to a desired length, in one operating mode, and adhesive-backed face material 46P in another operating mode. The length of either postage label 22R, or face material 46P is determined by monitoring the position of the leading edge, via a sensing device 70 disposed upstream of the label stripping station 50 and, in the described embodiment, immediately downstream of the print station 12. By monitoring the position of the leading edge together with information concerning the length of each printed label 22, the location of the trailing edge can be determined. More specifically, the processor 24 receives location data from the sensing device 70 to determine the position of the leading edge 22LE. This data, in combination with information acquired from the print station 12, i.e., regarding the length of the printed postage indicia IN, may be used to sever the face material 46 immediately downstream of the printed indicia, i.e., the trailing edge 22TE of the printed indicia IN, whether the printed label 22 is dispensed as an application ready label 22R or as printed face material 46P in preparation for receipt of re-liner material 48R at the re-lining station 80.

The downstream re-lining station 80 includes a means 82 for attaching re-lining material to the adhesive-backing of the printed face material 46P, and a second cutting apparatus 84, downstream of the lining means 82, for cutting the re-lining material 48R and dispensing at least one lined postage label 22L. While the re-lining station 80 may line a single postage label 22L, the re-lining station 80 will generally be used to dispense a plurality of lined labels 22L as a strip or length of lined labels 22L. These lined labels 22L may be applied to mailpieces at a later time and/or at a remote location.

More specifically, the means 82 for attaching re-lining material includes a supply of re-liner material 48R, and a third pair of rollers 86 defining a nip N2 for joining/combining the adhesive-backed material 46P dispersed/produced by the upstream stripping station 50. In the described embodiment, the re-liner material 48R is drawn through a fourth pair of rollers 92 and directed upwardly through a pair of guide members 94*a*, 94*b*. The upper and lower guide members 94*a*, 94*b* re-direct the re-liner material 48R from a direction having a vertical component to one having a predominately horizontal component, i.e., re-directing the re-liner material 48R to one having a substantially horizontal orientation. In the described embodiment, once the guide members 94*a*, 94*b* have re-directed the re-liner material 48R, i.e., to a substantially horizontal direction, the upper guide member 94*a* terminates prior to the lower guide member 94*b*, i.e., prior to reaching the nip N2 of the rollers 86. This arrangement allows the adhesive backing of the face material 46P to be joined with the re-liner material 48R upon entering the nip N2 of the rollers 86. The re-liner material 48R may be drawn through the rollers 86, 92 by motors $M_{86}$ and $M_{92}$, respectively. In the described embodiment, the supply of re-liner material 48R is provided by a reeling mechanism 96 disposed beneath the guide members 94*a*, 94*b*.

Figure 3A:
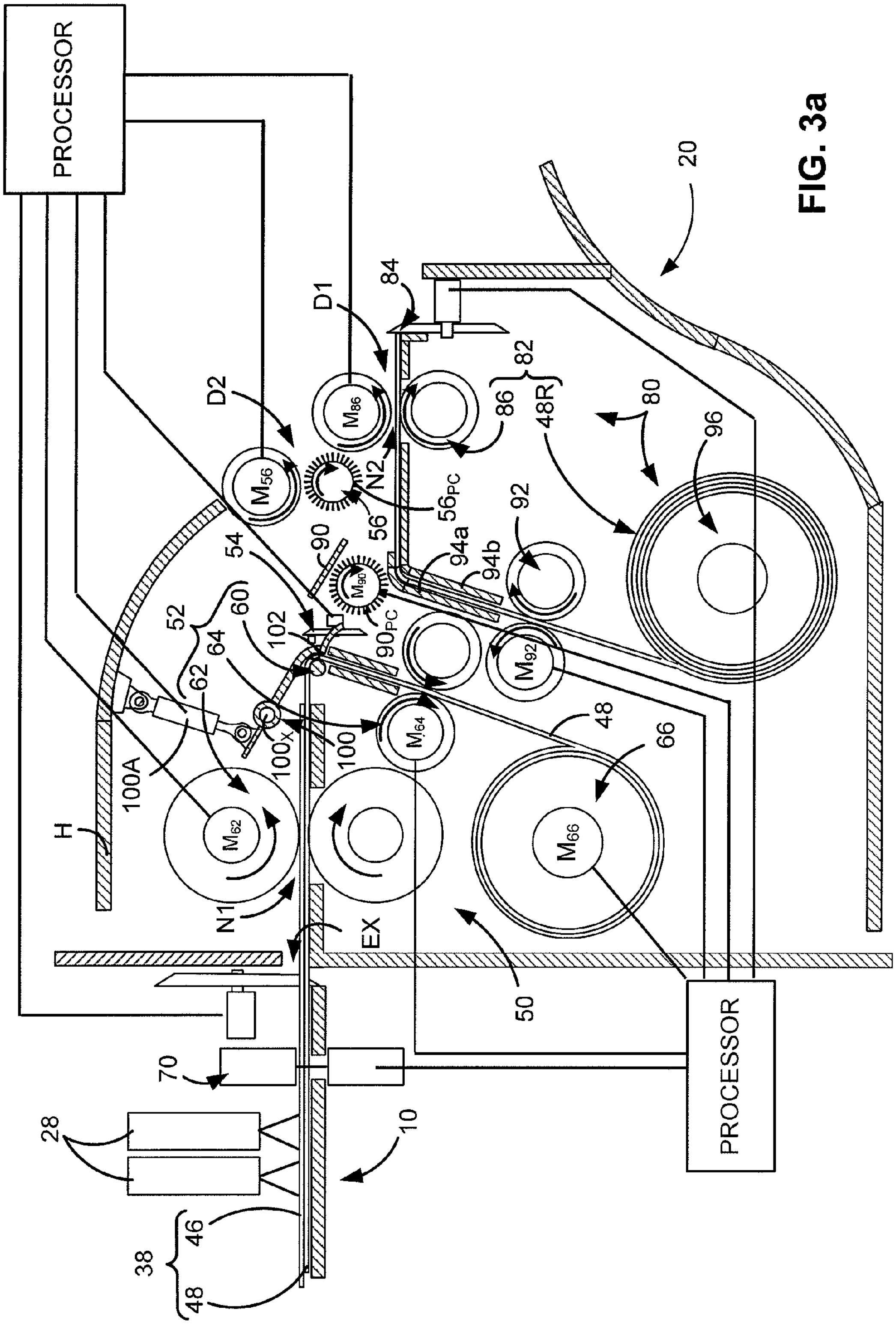
FIG. 3*a* is a side schematic view of, the label dispensing system wherein a deflector guide is shown in a first position operative to divert liner material to a take-up reeling mechanism during initial set-up of the label dispensing system.

In FIGS. 2 and 3*a*, a deflector guide 100 interposes the upstream stripping and downstream re-lining means 52, 82. In the described embodiment, the deflector guide 100 is pivotally mounted to the housing H of the label dispensing system 20 and is operative to assume one (1) of three (3) positions. In a first position, the deflector guide 100 (shown in dotted lines) engages and directs liner material 48 toward the liner reeling mechanism 66 and allows the conveyance system of the label transport system of the mailing machine 10 and upstream rollers 62 of the label dispensing system 20 to bi-directionally displace the label material along the feed path FPS, FP. In the second position, the deflector guide 100 (shown in dashed lines) is disengaged and inoperative with respect to the label material 38 such that the face material 46, separated from the liner material 48, passes through rollers 56 to dispense an application ready label 22R to an operator. And, in the third position the deflector guide 100 (shown in solid lines) engages and directs the adhesive-backed face material 46P to the re-lining station 80 to receive re-lining material 48R.

Figure 3B:
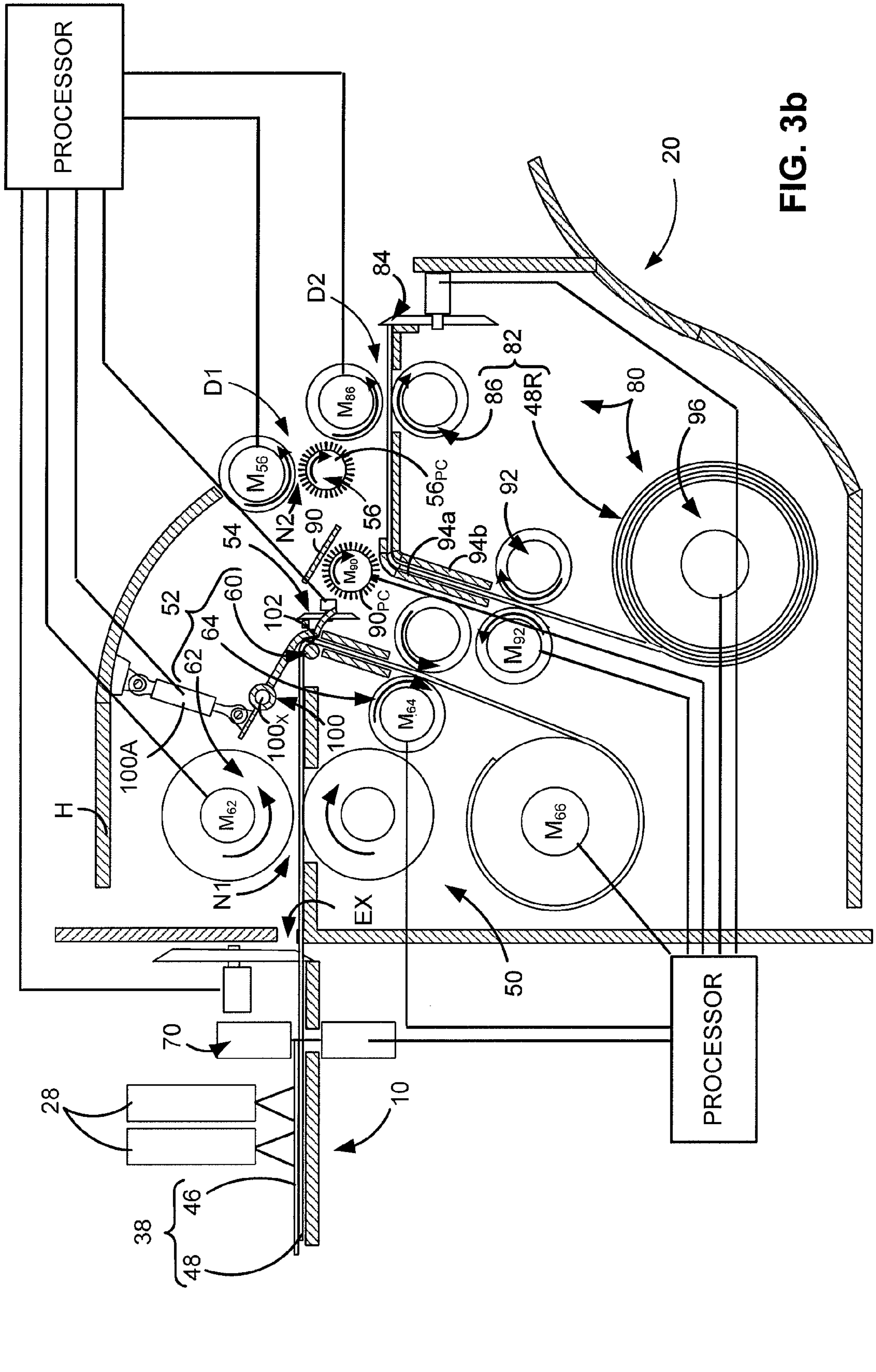
FIG. 3*b* is a side schematic view of the label dispensing system wherein a conveyance system reels the label material inwardly in preparation for printing an application ready/lined label.

More specifically, and referring to FIGS. 3*a*, and 3*b*, initial set-up of the label dispensing system 20 includes a length of label material 38, i.e., the first sixteen (16) to twenty-four (24) inches, which is un-faced, i.e., does not include face material 46, such that the label material 38 may be threaded between the first and second pair of rollers 62, 64 and across the peeler bar 60. Set-up is facilitated by the deflector guide 100, which, when positioned in the first position, directs the liner material 48 downwardly through the second pair of rollers 64. That is, a first deflector surface 102 of the deflector guide 100 is contoured to direct the liner material 48 around the peeler bar 60 toward the second pair of rollers 64 of the stripping station 50. Thereafter, in FIG. 3*b*, the leading edge 46E of the face material 46 is located by reeling the label material 38 inwardly toward the supply 36 such that a leading edge sensor 70 may sense the position of the leading edge 46E of the label material 38. The position of the leading edge 22LE may be stored and used by the processor 24 to coordinate the operation of the first and second cutting apparatus 54, 84 to determine the length of each printed postage indicia 46P dispersed by the stripping station 50, and the relative position of the adhesive backed face material 46P with the re-liner material 48R. Furthermore, one or more rotary encoders (not shown) may be integrated with one of the rollers 62, 64 to record and track the position of the leading edge along the feed path of the label material 38.

Figure 3C:
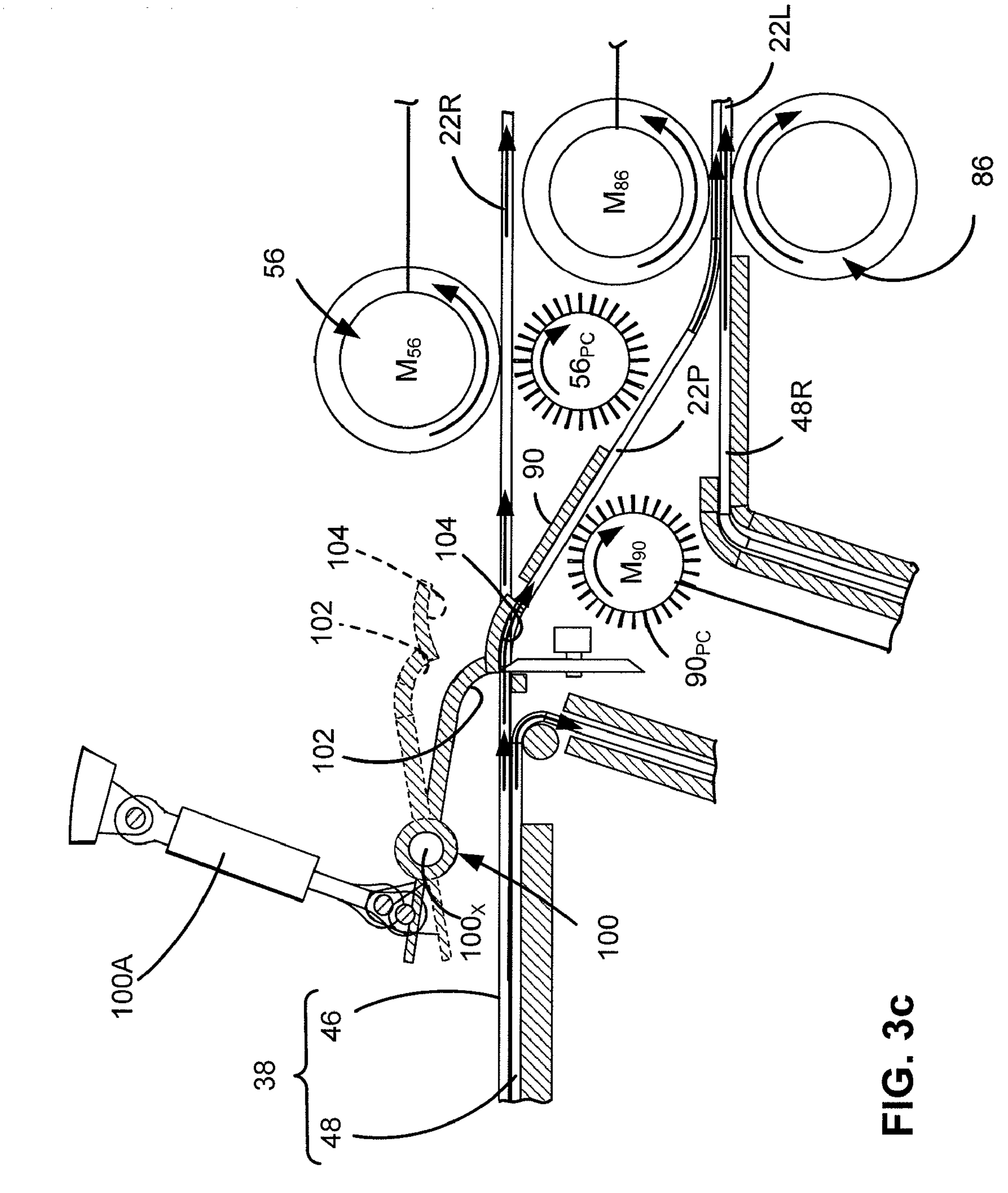
FIG. 3*c* is an enlarged view of the deflector guide shown in an engaged position (shown solid lines) to divert adhesive backed face material toward the re-lining station of the label dispensing system and, in a disengaged position, to dispense application ready postage labels.

In FIG. 3*c*, the deflector guide 100 is shown in its engaged and disengaged positions. In the engaged position (shown in solid lines), the deflector guide 100 directs adhesive-backed face material 46P toward the re-lining station 80. The deflector guide 100 includes a second deflector surface 104, downstream of the first deflector surface 102 (see FIG. 3*b*) which directs one or more adhesive-backed face material 46P between an ingestion guide 90 and a point contact roller 90PC which, in turn, conveys the face material 46P to the rollers 86 of the re-lining station 80. In the disengaged position (shown in dashed lines), the deflector guide 100 is pivoted upwardly, in a counter-clockwise direction, such that the deflector guide 100 is inoperative. That is, in the disengaged position, the deflector guide 100 is pivoted away from the feed path of the label material 38 such that an application ready label 22R is dispensed through the dispensing outlet D1 of the label dispensing system 20.

Figure 4:
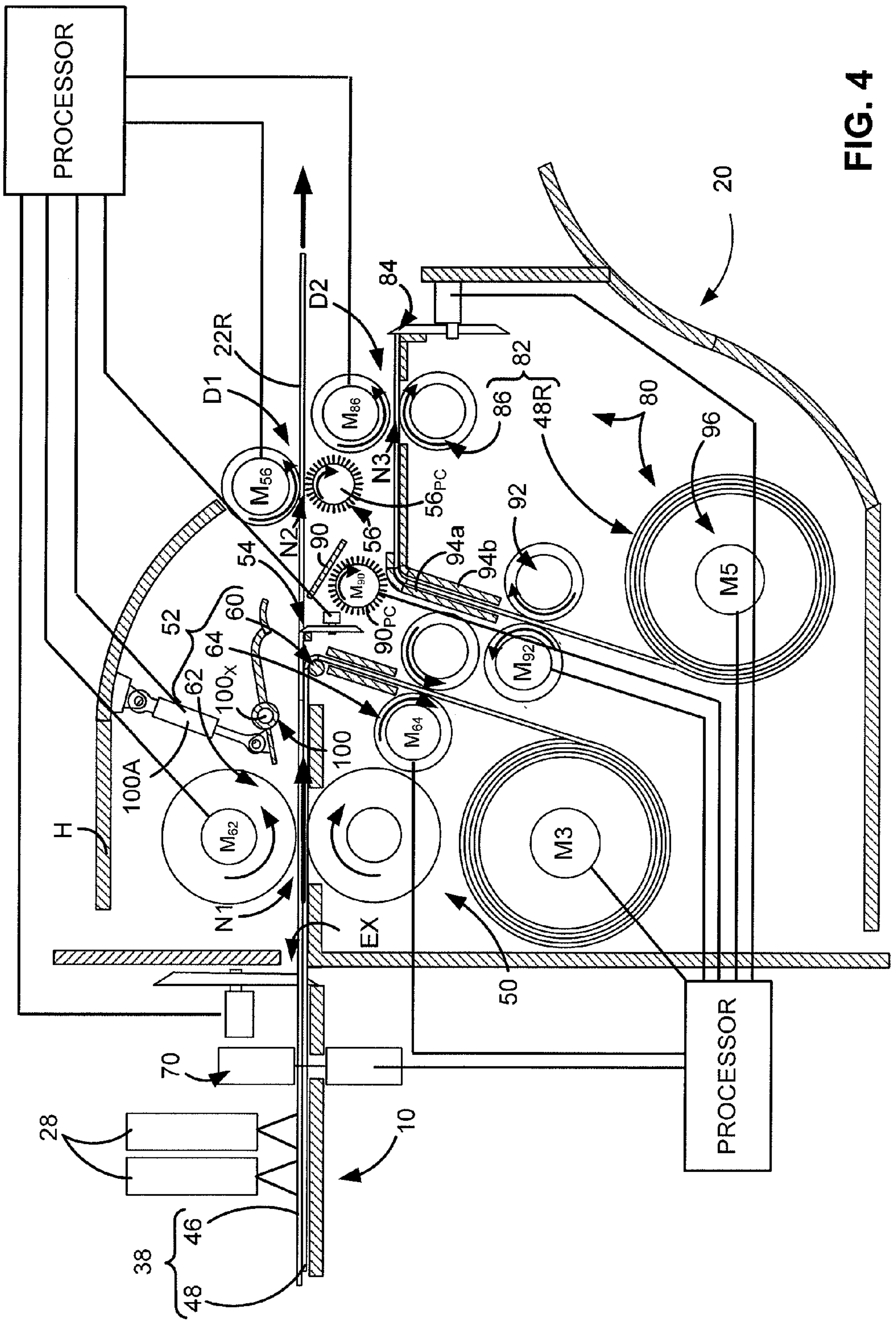
FIG. 4 is a side schematic view of the label dispensing system wherein the deflector guide is in a second, or disengaged, position and the liner material is drawn taut across a peeler bar to effect an abrupt directional change in the label material to strip adhesive backed face material from the liner material and dispensing an application ready label through a first dispensing outlet.

In FIGS. 3*c* and 4, deflector guide 100 is in its disengaged position (in dashed lines) and the adhesive backed face material 46P is drawn through the exit rollers 56, including a point contact 56PC. As mentioned previously, the point contact roller 56PC is used to prevent the adhesive-backed face material 46P from bonding/adhering to the roller 56PC as the adhesive backing passes through the nip N2 of the pair of rollers 56. Once past the rollers 56, the processor 24 pauses the drive motor M56 to stop the rollers 56 and an application ready label 22R is dispensed, i.e., awaiting removal by an operator.

Figure 5:
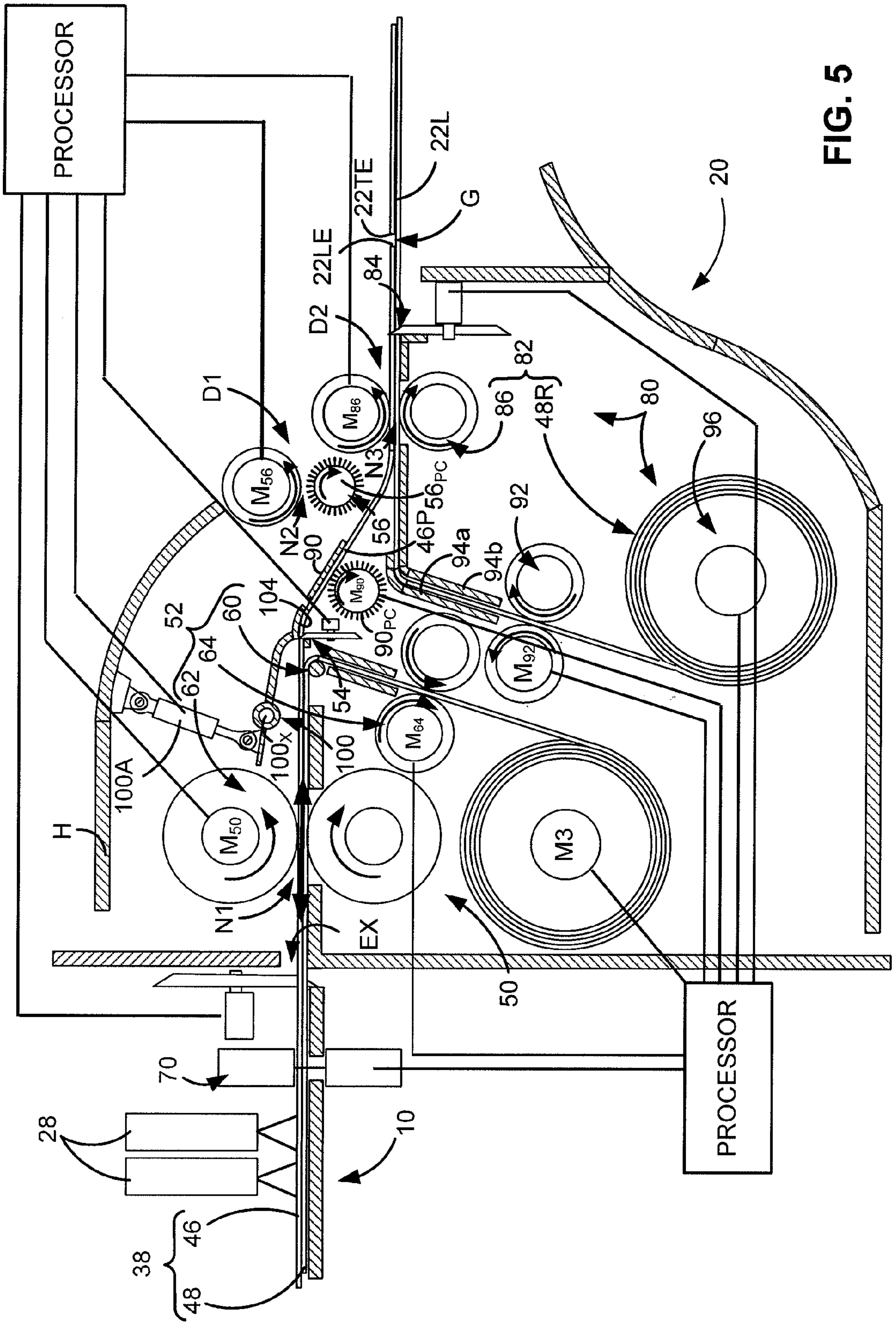
FIG. 5 is a side schematic view of the label dispensing system wherein the liner material is drawn taut across a peeler bar to separate the adhesive backed face material from the liner material, and the deflector guide is in a third position operative to re-direct the adhesive backed face material toward a pair of rollers defining an ingestion nip of the downstream re-lining station.

In FIGS. 3*c* and 5, the deflector guide 100 is in its disengaged position (shown in solid lines) and the adhesive backed face material 46P is received by the re-lining station 80. Therein, re-liner material 48R is disposed in combination with the adhesive backed face material 46P such that re-liner material 48R is combined with the adhesive backed face material 46P and is oversized relative thereto. In the context used herein, "oversized" means that the leading and/or trailing edge 48LE, 48TE of the re-liner material 48R extends beyond the leading or trailing edge 22LE, 22TE (also seen in FIG. 1) of the postage label 22L, or that at least one of the side edges 48SE of the re-liner material 48R extends beyond the respective side edge 22SE of the postage label 22L. Alternatively, a plurality of lined postage labels 22L may be produced by driving the feed rate of the face material 46P and re-liner material 48R, via the drive motors $M_{86}$, $M_{90}$, $M_{92}$ such that that a gap G is produced between consecutive adhesive backed postage labels 22L. Whether the re-liner material 48R is oversized relative to the face material 46P or gaps G are produced between consecutive adhesive backed labels 22L, the relative spacing between the edges 22LE, 22TE, 22SE (also see in FIG. 1) and the re-liner material 48R facilitates separation of each postage label 22L from the underlying re-liner material 48R.

In summary, the system for dispensing labels operates in at least two operating modes to dispense printed labels 22R in a condition ready for application, and lined labels 22L which may be used at any time or at any location produced. A first mode of operation dispenses application ready labels for immediate application. In another operating mode. In another operating mode lined labels 22L are dispensed as a stream of tandemly arranged printed labels 22L or stacked for use at a subsequent time or at a remote location. The requirement for kiss-cuts, i.e., a highly accurate cut through the depth of the face material, are eliminated by re-lining station 80 disposed downstream of a stripping station 50. The ability to produce gaps between consecutive labels 22 facilitates removal and application of each lined label 22L It is to be understood that the present invention is not to be considered as limited to the specific embodiments described above and shown in the accompanying drawings. The illustrations merely show the best mode presently contemplated for carrying out the invention, and which is susceptible to such changes as may be obvious to one skilled in the art. The invention is intended to cover all such variations, modifications and equivalents thereof as may be deemed to be within the scope of the claims appended hereto.

What is claimed is:

1. A postage label dispensing system for dispensing adhesive-backed postage labels, the label dispensing system receiving a supply of label material including an adhesive-backed face material and a liner material disposed over and carrying the adhesive backing of the face material, comprising:

a means for stripping the adhesive-backed face material from the liner material, the face material having a postage indicia printed thereon, the stripping means further including a peeler bar for effecting an abrupt directional change in the label material such that each the adhesive backed face material separates from the underlying lining material;

a first cutting apparatus, downstream of the stripping means, for cutting the face material to a desired length and producing adhesive backed face material;

a re-lining means for re-attaching a lining material to the adhesive backed face material;

a second cutting apparatus, downstream of the re-lining means, for cutting the re-lined adhesive backed face material to dispense at least one lined postage label; and a deflector guide cooperating with the stripping and re-lining means, the deflector guide being re-positionable from an engaged position to a disengaged position, such that, in the engaged position, the deflector guide is operative to re-direct the adhesive-backed face material from the stripping means to the re-lining means, and in the disengaged position, the deflector guide is inoperative such that the adhesive backed face material is dispensed as an application-ready label; and a processor for controlling the operation of the first and second cutting apparatus, the stripping and re-lining means, and the deflector guide.

2. The postage label dispensing system according to claim 1 wherein the re-lining means attaches re-liner material to the adhesive backed postage labels such that a gap is produced between consecutive adhesive backed postage labels.

3. The postage label dispensing system according to claim 1 wherein the re-lining means attaches a re-liner material which is oversized relative to the adhesive backed postage label to facilitate separation of the liner material from the postage label upon use.

4. The postage label dispensing system according to claim 1 wherein the stripping means dispenses application ready postage labels in one operating mode and wherein the re-lining means dispenses lined labels in another operating mode.

5. The postage label dispensing system according to claim 1 further comprising a sensing means for determining the position of the leading edge of the adhesive backed face material, a means for determining the length of the printed postage indicia such that the first cutting apparatus cuts the adhesive backed face material in accordance with the determined length of the postage indicia, the first cutting apparatus cutting the adhesive backed face material along a trailing edge.

6. A postage label dispensing system for dispensing adhesive-backed postage labels, the label dispensing system receiving a supply of label material including an adhesive-backed face material and a liner material disposed over and carrying the adhesive backing of the face material, comprising:

a stripping station and a re-lining station;

the stripping station receiving the supply of label material and including a means for stripping the adhesive-backed face material from the liner material and a first cutting apparatus, downstream of the stripping means, for cutting the face material to a desired length and producing adhesive backed face material having a postage indicia printed thereon;

the re-lining station receiving the adhesive backed face material and including a re-lining means for re-attaching a liner material to the adhesive backed face material and a second cutting apparatus, downstream of the lining means, for cutting the relining material to dispense at least one lined postage label, and a deflector guide cooperating with the stripping means and first cutting apparatus of the stripping station, the deflector guide being re-positionable from an engaged position to a disengaged position, such that in the engaged position, the deflector guide is operative to re-direct the adhesive-backed face material from the stripping station to the re-lining station to dispense a lined-label through a dispensing outlet, and, in a disengaged position, the deflector guide is inoperative to dispense an application ready label through another dispensing outlet; and a processor for controlling the position of the deflector guide and operating of the stripping and re-lining stations such that application ready and lined labels are dispensed depending upon a selected operating mode.

7. The postage label dispensing system according to claim 6 wherein the re-lining means attaches re-liner material to the adhesive backed postage labels such that a gap is produced between consecutive adhesive backed postage labels.

8. The postage label dispensing system according to claim 1 wherein the re-lining means attaches a re-liner material which is oversized relative to the adhesive backed postage label to facilitate separation of the liner material from the postage label upon use.

9. The postage label dispensing system according to claim 6 wherein the stripping means dispenses application ready postage labels in one operating mode and wherein the lining means dispenses lined labels in another operating mode.

10. The postage label dispensing system according to claim 6 further comprising a sensing means for determining the position of the leading edge of the adhesive backed face material, a means for determining the length of the printed postage indicia such that the first cutting apparatus cuts the adhesive backed face material in accordance with the determined length of the postage indicia, the first cutting apparatus cutting the adhesive backed face material along a trailing edge.

11. The postage label dispensing system according to claim 6 wherein the stripping means includes a peeler bar for effecting an abrupt directional change in the label material such that the adhesive face material separates from the underlying liner material.

* * * * *